United States Patent [19]

Shah et al.

[11] 4,205,373
[45] May 27, 1980

[54] SYSTEM AND METHOD FOR ACCESSING MEMORY CONNECTED TO DIFFERENT BUS AND REQUESTING SUBSYSTEM

[75] Inventors: Niranjan S. Shah; James F. Taylor, both of Escondido, Calif.

[73] Assignee: NCR Corporation, Dayton, Ohio

[21] Appl. No.: 908,183

[22] Filed: May 22, 1978

[51] Int. Cl.² .......................... G06F 13/00; G06F 3/04
[52] U.S. Cl. .................................................. 364/200
[58] Field of Search ... 364/200 MS File, 900 MS File; 179/15 AL

[56] References Cited

U.S. PATENT DOCUMENTS

| | | | |
|---|---|---|---|
| 3,890,471 | 6/1975 | Hachenburg | 179/15 AL |
| 3,932,841 | 1/1976 | Deerfield et al. | 364/200 |
| 3,940,743 | 2/1976 | Fitzgerald | 364/200 |
| 4,041,472 | 8/1977 | Shah et al. | 364/900 |

Primary Examiner—Gareth D. Shaw
Assistant Examiner—Thomas M. Heckler
Attorney, Agent, or Firm—J. T. Cavender; Edward Dugas; Stephen F. Jewett

[57] ABSTRACT

A method and system for accessing a memory subsystem from a requesting subsystem connected to a first bus. The memory subsystem is connected to a second bus. A pair of adaptors coupled to each other by a cable are respectively connected to the first and second busses. The requesting subsystem has a plurality of input-/output paths from which a memory message can be transmitted to the first bus. Each such transmitted memory message includes a source code identifying the address of the requesting subsystem on the first bus and a tag bit identifying the one of the input/output paths from which the memory message is transmitted. The first adaptor has the same address on the first bus as the memory subsystem has on the second bus and receives a memory message addressed to the memory subsystem. A second adaptor determines whether a response message from the memory is required by the memory message and, if so, stores the first source code and tag bit and inserts a second source code identifying the address of the second adaptor on the second bus and a second tag bit identifying the location of the stored source code and tag bit. The second adaptor then transmits the modified memory message to the memory subsystem. If a response message is required, the memory subsystem transmits the response message back to the second adaptor, which re-inserts the stored source code and tag bit and transmits the modified memory response message back to the requesting subsystem, which routes the modified response message to the input/output path determined by the first tag bit.

16 Claims, 11 Drawing Figures

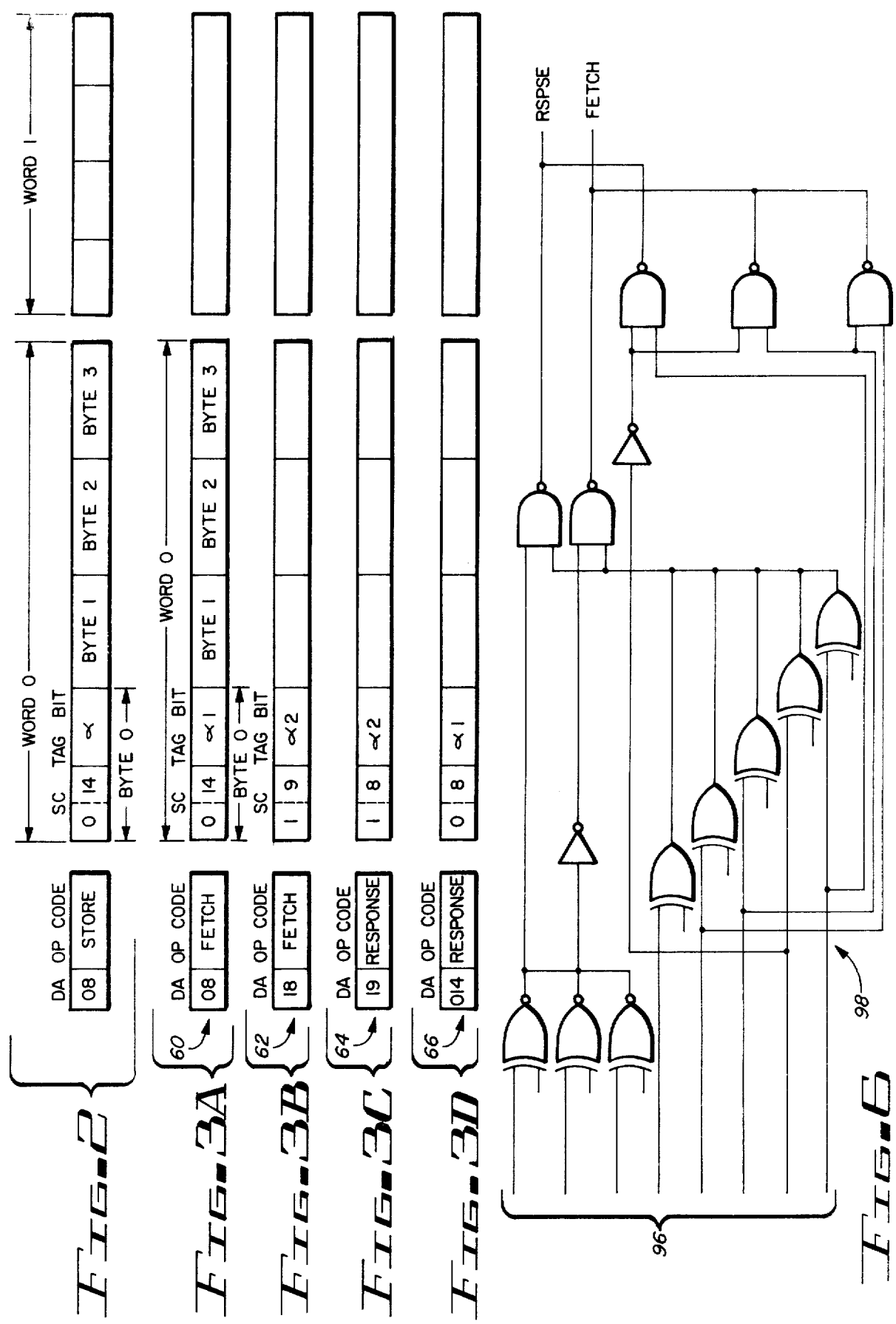

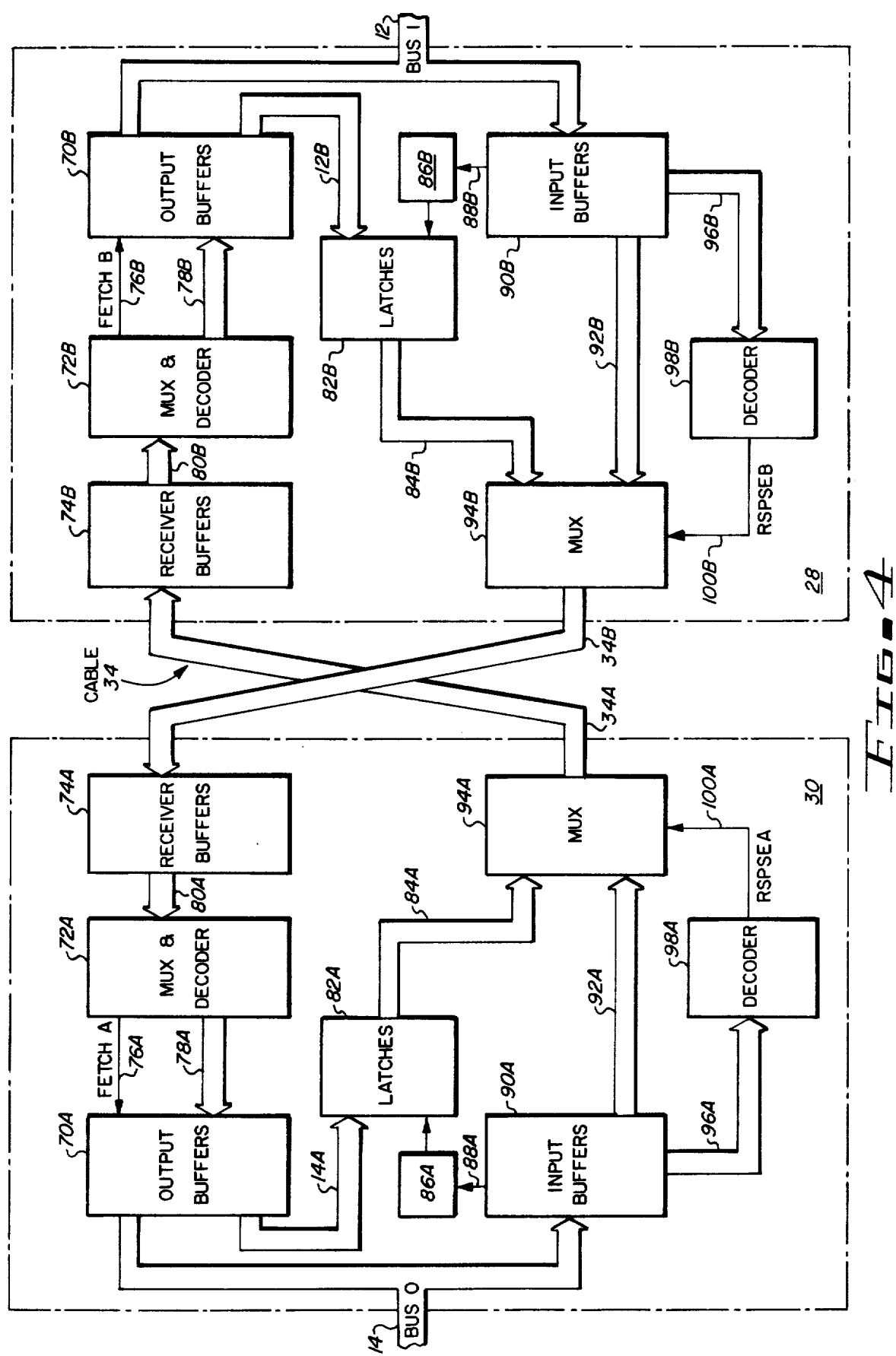

SYSTEM AND METHOD FOR ACCESSING MEMORY CONNECTED TO DIFFERENT BUS AND REQUESTING SUBSYSTEM

BACKGROUND OF THE INVENTION

1. Field of the Invention

The invention relates to systems and methods for accessing memory subsystems connected to time-shared busses other than a time-shared bus to which a requesting subsystem is connected.

2. Description of the Prior Art

Random access memory capacity is a fundamental parameter of the performance capability of any data processing system. Many data processing systems are capable of handling several optional sizes of random access memories as part of the system. Further, many data processing systems have the facility to accept additional random access memory in the form of freestanding units. Many data processing systems further include a number of subsystems which utilize a plurality of intercommunication busses which can be time-shared among the various subsystems. Random access memory subsystems and various other subsystems are typically connected to each such intercommunications bus. One such system is described in U.S. Pat. No. 4,041,472, issued Aug. 9, 1977, entitled "SYSTEM AND METHOD FOR SHARING MEMORY," assigned to the same Assignee as the present invention, and hereinafter referred to as the Shah patent. The Shah patent describes a system involving at least two pairs of interbus communications adaptors to accomplish interbus communication between a requesting subsystem connected to one bus and a memory subsystem connected to another bus, thereby permitting a subsystem connected to one bus to, in effect, expand the amount of random access memory available to that subsystem by accessing not only memory connected to that bus, but also random access memory connected to other intercommunication busses in the same system. The described system avoids the cost of connecting additional free-standing random access memory units to a particular intercommunications bus to which a subsystem requiring additional memory capacity is connected, if memory capacity is available on other intercommunication busses of the same system. However, the system described in the Shah patent requires separate pairs of interbus communication adaptors for the request messages and corresponding response messages between a requesting subsystem and a memory subsystem.

SUMMARY OF THE INVENTION

Accordingly, it is an object of the invention to provide a low cost system and method for accessing a memory subsystem connected to a separate bus than the bus to which a requesting subsystem is connected.

It is another object of the invention to provide a low cost system and method of expanding the amount of memory accessible by a subsystem connected to one bus of a multi-bus system.

It is another object of the invention to provide a system and method for accessing a memory subsystem connected to a different bus than the accessing subsystem wherein the requesting subsystem can receive response messages from the memory subsystem in an order different than the order of transmission of the corresponding request messages from the requesting subsystem.

It is yet another object of the invention to provide a low cost system and method for accessing memory subsystem connected to a different bus than the requesting subsystem requiring only one communications path between the bus connected to the memory subsystem and a bus connected to the requesting subsystem.

Briefly described, and in accordance with one embodiment thereof, the invention provides a system and method utilizing a requesting subsystem connected to a first internal transfer bus to access a memory subsystem connected to a second internal transfer bus. The memory subsystem is connected to an addressable port on the second bus and the requesting subsystem is connected to an addressable port on the first bus. A first memory communications adaptor is connected to an addressable port of the first bus, and a second memory communications adaptor is connected to an addressable port of the second bus. The two memory communications adaptors are connected by a cable. The requesting subsystem has a plurality of internal input/output circuit paths from which a request message can be transmitted to the first internal transfer bus. A request message transmitted to the first internal transfer bus includes a destination address including the bus number and port number (i.e., address) to which the first memory communications adaptor is connected, and also includes a first tag bit identifying the internal input/output circuit paths from which the request message is transmitted. The request message also contains a first source code including the bus number and the port number of the requesting subsystem. The request message also contains an operation code. The first memory communications adaptor determines that the message is not a response message and routes the message over the cable to the second memory communications adaptor, which determines whether a response message from the memory subsystem is required, and if so, the second memory communication adaptor stores the first source code and first tag bit and inserts a second source code containing the port number of the second bus, to which the second memory communications adaptor is connected, and a second tag bit identifying the location of the stored first source code and first tag bit. The modified memory message is then transmitted onto the second internal transfer bus, and is routed to the port of the memory subsystem. If the memory message requires a response, the memory subsystem transfers the second source code into the destination address bit locations of a response message and transmits the response message to the second memory communications adaptor via the second internal transfer bus. The second memory communications adaptor checks the operations code bit of the response message, determines that the message is a response, inserts the stored first tag bit and first source code into the tag bit and destination address bits, respectively, of the response message. The second memory communications adaptor then transmits the modified response message unchanged via the first memory communications adaptor and the first internal transfer bus to the requesting subsystem. The requesting subsystem routes the modified response message into the input/output circuit path determined by the first tag bit.

BRIEF DESCRIPTION OF THE DRAWINGS

FIG. 2 is a diagram of a message format useful in describing the operation of the embodiment of FIG. 1.

FIGS. 3A–3D illustrate the changes in a request message from the requesting subsystem and the corresponding response from the memory subsystem during operation of the embodiment of the invention shown in FIG. 1.

FIG. 4 is a detailed block diagram showing both of the memory communications adaptors of FIG. 1.

FIG. 6 is a schematic logic diagram of the decoder circuitry of FIG. 4.

DESCRIPTION OF THE INVENTION

A discussion of data processing systems having multiple time-shared internal transfer busses connected to multiple bus controllers and having various subsystems, including memory subsystems connected to the various internal transfer busses and further having intercommunications adaptors for interbus communication, is described in the above-mentioned, commonly assigned U.S. Pat. No. 4,041,472, entitled "SYSTEM AND METHOD FOR SHARING MEMORY," filed on Apr. 29, 1976, issued on Aug. 9, 1977, by Niranjan Shah and James Taylor, and entirely incorporated by reference herein. Details of the internal transfer busses, bus controllers, and various subsystems and local bus adaptors connected to the internal transfer busses are set forth in the referenced patent, hereinafter referred to as the Shah patent.

Figure 1:
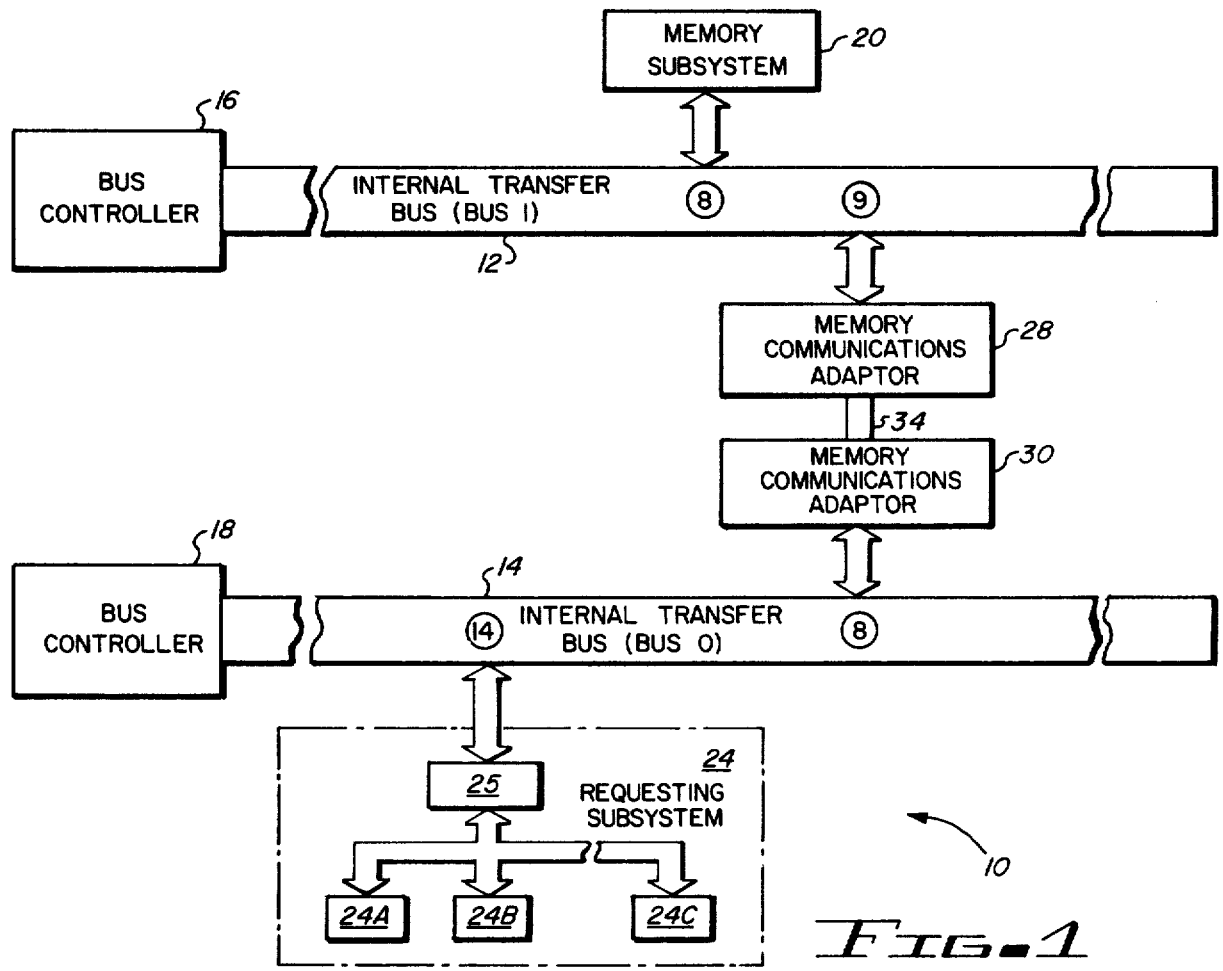
FIG. 1 is a block diagram of a data processing system utilizing two internal transfer busses and a pair of memory communications adaptors for permitting a requesting subsystem connected to one internal transfer bus to access a memory subsystem connected to the other internal transfer bus.

Referring now to FIG. 1, system 10 includes time-shared internal transfer busses 12 and 14, hereinafter occasionally referred to as bus 1 and bus 0, respectively. Each internal transfer bus is utilized to accomplish transfer of information between various subsystems which may be connected thereto, as explained in the above Shah patent. As also explained in the Shah patent, the bus controllers 16 and 18, connected respectively to internal transfer busses 12 and 14, can each provide several important system functions, including providing a subsystem clock for clocking all of the message transfers on the appropriate internal transfer bus, checking priority of messages transferred on the internal transfer bus, and notifying the various subsystems connected to that internal transfer bus that the priority is correct. As explained in the above referenced Shah patent, the bus controller can also maintain a history log which keeps a record of recent transmissions on the connected internal transfer bus.

Each internal transfer bus includes a plurality of data lines for transmitting messages between and among the various subsystems and adaptors connected to that bus. Each internal transfer bus 12 and 14 is provided with a plurality of addressable connection ports (hereinafter, simply ports), each of which is intended for connection into a subsystem or adaptor. As part of the overall data processing system architecture, certain ports are designated for certain types of subsystems.

In FIG. 1, ports 8 and 9 are reserved for memory subsystems. Other ports on bus 1, although not shown in FIG. 1, are utilized for connecting various other subsystems to bus 1, as explained in the above-referenced Shah application. Port 14 in FIG. 1 is utilized for connection of subsystem 24, occasionally referred to hereinafter as the requesting subsystem, to bus 0. Requesting subsystem 24 is a subsystem, such as a processor subsystem, which is capable of accessing various memory subsystems to store information therein or to fetch information therefrom.

Figure 7:
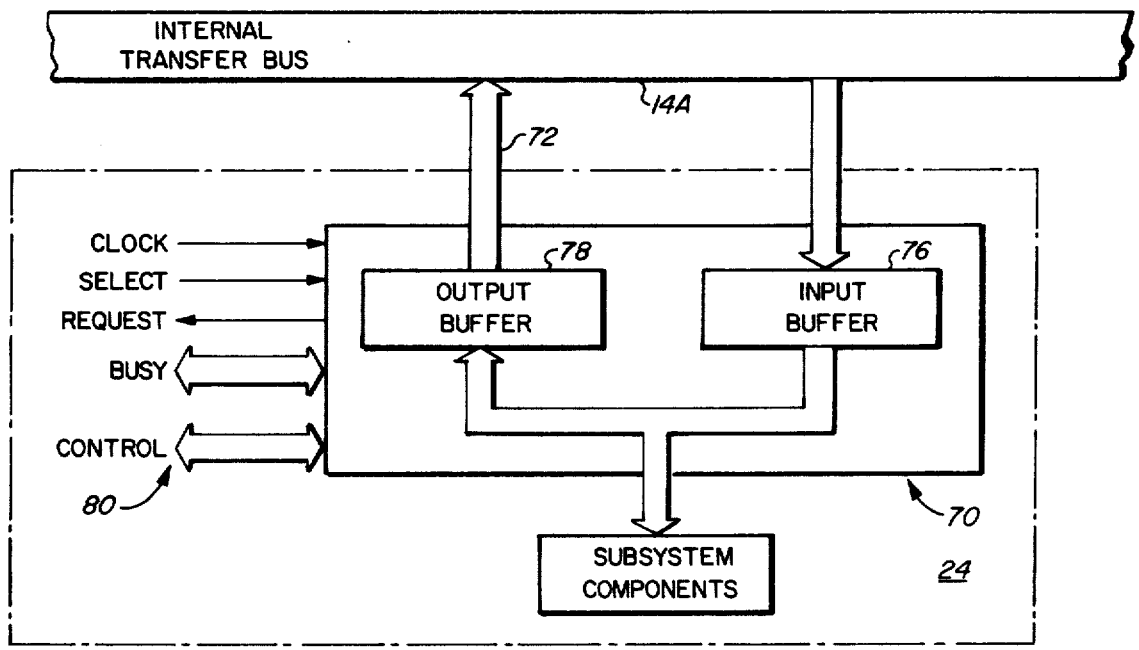
FIG. 7 is a schematic logic diagram of a bus adaptor circuit incorporated in the requesting subsystem and memory subsystem of FIG. 1.

It should be noted that memory subsystem 20 and requesting subsystem 24 in FIG. 1 incorporate so-called local bus adaptors, which are described in more detail in the above-referenced Shah patent, and which are included in and perform the functions of coupling the various subsystems to the appropriate internal transfer busses. FIG. 7 shows a logic diagram of a local bus adaptor 70 incorporated in a subsystem 24, which can be either a requesting subsystem or a memory subsystem. Local bus adaptor 70 includes an input buffer 76 and an output buffer 78 coupled to an internal transfer bus 14A and to the operative components of subsystem 24. Operation of local bus adaptor 70, in conjunction with system signals such as clocks, select signals, request signals, busy signals, and control signals, can be readily implemented by those skilled in the art, and is not set forth herein.

More specifically, requesting subsystem 24 is connected to port 14 of bus 0. Requesting subsystem 24, which is a processor-oriented subsystem, includes a plurality of registers or memory locations 24A, 24B, and 24C to which various messages can be routed in the course of being transmitted to or received from bus 0. The tag bits identify the particular register from which a particular memory request message emanates. Circuitry 25 assigns "tag bits" to messages transmitted from requesting subsystem 24 and compares tag bits of messages received from memory subsystem 20 with tag bits previously assigned to messages transmitted from requesting subsystem 24. Circuitry 25 utilizes such tag bits to ensure that a response message from memory subsystem 20 produced in response to a particular memory request message is routed back to the same one of registers 24A, 24B, 24C, etc. from which the corresponding request message was originally transmitted.

Memory communications adaptor 30 is connected to port 8 of bus 0, which is the same port number as the port number of bus 1 to which memory subsystem 20 is connected. Memory communications adaptor 30 is connected to memory communications adaptor 28 by means of cable 34. Memory communications adaptor 28 is connected to port 9 of bus 1.

The memory messages and response messages transmitted between requesting subsystem 24 and memory subsystem 20 all have the message format shown in FIG. 2. Referring to FIG. 2, the message format includes a destination address (DA) which includes a two-bit bus number and a four bit port number. For example, the number 08 shown in the destination address of FIG. 2 means that the message is to be transmitted on bus 0, and is addressed to port 8. (As will be subsequently seen, the "0" of the destination address will be changed to a "1" when the memory message is transmitted to bus 1.) The op code (operation code) is contained in bits 6-24 of the memory message of FIG. 2. The op code is capable of specifying a number of operations, including a "store" operation, wherein data contained in the message from subsystem 24 is written into memory subsystem 20, and a "fetch" instruction, wherein stored information is read out of memory subsystem 20.

Still referring to FIG. 2, WORD 0 includes four bytes. The first byte includes a source code (SC) and a tag bit. The remaining three bytes of WORD 0 and all four bytes of WORD 1 contain data and address information. Bits 25-30 of byte 0 of WORD 0 contain the source code. The first two bits of the source code contain a bus number and the remaining four bits contain a port number. Bits 31 and 32 contain the above-mentioned tag bits, and are utilized to identify the register or input/output circuit path in subsystem 24 from which the memory message was originally transmitted.

FIGS. 3A-3B show the contents of the first thirty-two bits of a "fetch" message (occasionaly referred to herein as a "request message") transmitted by requesting subsystem 24 to memory subsystem 20. FIGS. 3C-D show a corresponding response message transmitted from memory subsystem 20 back to requesting subsystem 24. Message 60 of FIG. 3A shows the destination address, op code, source code, and tag bits inserted in the request message 60 by subsystem 24 before request message 60 is transmitted onto bus 0. FIG. 3B shows how the destination address, source code and tag bits are modified by memory communications adaptor 28 after the message is received thereby but before it is transmitted as message 62 via bus 1 to memory subsystem 20. FIG. 3C shows the destination address, op code, and source code provided by memory subsystem 20 for the response message 64 (which would ordinarily contain different data in the remaining bytes of WORD 0 and WORD 1 than were contained in the request message of FIGS. 3A and 3B) prior to transmission to memory communications adaptor 28 via bus 1. Finally, FIG. 3D shows how memory communications adaptor 28 modifies destination address, op code, source code, and tag bits of response message 64 before transmitting it as message 66 to requesting subsystem 24 via memory communications adaptor 30 and bus 0.

Before describing the operation of the system of FIG. 1 during the time that the request message of FIG. 3A is transmitted from subsystem 24, it will be helpful to describe the detailed components of memory communications adaptors 28 and 30. FIG. 4 shows detailed block diagrams of the main internal components of memory communications adaptors 28 and 30 cooperating to properly modify and transmit the memory request message and the memory response message of FIGS. 3A-3D. Memory communications adaptors 28 and 30, as shown in FIG. 4, are substantially identical devices, and the same reference numerals have been utilized to indicate the various components and busses of each, except that each reference numeral of memory communications adaptor 30 has been followed by the letter "A", and each reference numeral of memory communications adaptor 28 is followed by the letter "B". The structural details of memory communications adaptor 30 will now be set forth in detail.

Bus 0 (reference numeral 14) is connected to inputs of a group of input buffers indicated by 90A. Input buffers 90A are implemented utilizing Motorola MC10170 hex D-type master/slave flip flops. The outputs of input buffers 90A corresponding to the op code bits of a memory message are transmitted via a group of conductors, represented by 96A, to inputs of decoder 98A, which includes circuitry shown in detail in FIG. 6, including eight exclusive OR/NOR gates and several additional logic gates. Decoder 98A produces an output signal RSPSEA on conductor 100A, which is inputted to multiplex circuitry 94A.

Multiplexer circuitry 94A is implemented utilizing three Motorola MC10158 two-to-one multiplexers. The outputs of the ones of input buffers 90A corresponding to bits 25-32, corresponding to BYTE 0 of WORD 0, are routed via a group of conductors 92A to the inputs of multiplexer circuitry 94A. Other inputs of multiplexer 94A are connected to a group of conductors 84A, which are connected to the outputs of latches 82A. Latches 82A are implemented utilizing Motorola MC10133 quad latches having their inputs connected to conductors of Bus 0 representing the bits of BYTE 0 of WORD 0; these conductors are also connected to corresponding outputs of output buffers 70A. Circuitry 86A, responsive to a signal on conductor 88A, produces an input to latch circuitry 82A to store the source code and tag bits of an incoming request message.

Output buffer circuits 70A are also implemented utilizing MC10133 quad latches. Output buffer latches 70A are clocked by a signal FETCHA on conductor 76A, produced by multiplex and decode circuitry 72A. Multiplex and decode circuitry 72A is implemented utilizing Motorola MC10158 two-to-one multiplexers. Other outputs of multiplex and decode circuitry 72A are connected via a group of conductors 78A to the various inputs of output buffer circuitry 70A. The inputs of multiplex and decode circuitry 72A are connected to group conductors 80A, outputted from receiver buffer circuitry 74A. The inputs of receiver buffers 74A are connected to a group of conductors 34B, which, together with conductors 34A, form a cable between memory communications adaptors 28 and 30. Receiver buffer circuitry 74A is implemented utilizing Motorola MC10176 hex D-type master/slave flip flops.

The circuitry included in decoder 98A of FIG. 4 is shown in more detail in FIG. 6. The exclusive OR and exclusive NOR circuits are implemented by Motorola MC10107 integrated circuits. The AND gates are implemented utilizing Motorola MC10101 and MC10104 integrated circuits.

The description of an operating sequence wherein a memory request message is transmitted from subsystem 24 to memory subsystem 20 and wherein a response message is transmitted from memory subsystem 20 to subsystem 24 is now explained with reference to FIGS. 1, 3A-3D, 4, 5A and 5B. The request message 60 in FIG. 3A is generated in requesting subsystem 24, as indicated in block 200 of FIG. 5A. Request message 60 is then loaded into the appropriate local bus adaptor output buffer of requesting subsystem 24, (see output buffer 78 of FIG. 7), and is transmitted via port 14 of bus 0 from subsystem 24 to port 8 of bus 0, as indicated by block 210 in FIG. 5A, after the necessary formalities of obtaining access to bus 0 are accomplished, as indicated by blocks 202, 204, 206, and 208 of FIG. 5A. The destination address bits "08" indicate that the message destination is memory subsystem 20, which is connected to port 8 of Bus 1. The op code of request message 60 indicates that the message is a FETCH message. The source code bits "0 14" indicate that the request message 60 is being sent from the subsystem connected to bus 0, port 14. The tag bits (α1) designate which of the registers 24A, 24B, 24C, etc. of subsystem 24 from which message 60 emanates. Thus, BYTE 0 of WORD 0 includes the information necessary to identify the requesting subsystem, including the internal register or input/output circuit path thereof, from which the request message was originally transmitted. This information is automatically inserted by the circuitry 25 of subsystem 24, (which may be readily implemented by those skilled in the art) before it is loaded in the output buffer of the local bus adaptor of requesting subsystem 24. As previously mentioned, it is necessary that the particular register within requesting subsystem 24 be identified so that if memory response messages are received in an order different than the order of transmission of the corresponding request messages, the requesting subsystem can determine which of the received response messages correspond to the various earlier request messages.

The purpose of the tag bits is thus to perform a "bookkeeping" function to insure that the response message gets back to the proper register or input/output circuit path of the requesting subsystem by "pointing" to a register from which the corresponding request message was originally transmitted.

Request message 60 is transferred from port 8 of Bus 0 to memory communications adaptor 30, which "checks" the op code to see if request message 60 is a response. Memory communications adaptor 30 makes a determination, based on the op code, that request message 60 is not itself a memory response message, by means of decoder 98A of FIG. 4. Since message 60 is not a memory response message, a logical "0" is transmitted on conductor 100A of FIG. 4. Message 60 is then transmitted unchanged by means of multiplexer circuitry 94A to receiver buffer 74B of memory communications adaptor 28 via cable conductors 34A, as indicated by blocks 212 and 214 of FIG. 5A.

Memory communications adaptor 28 examines the op code bits by means of decoding circuitry in multiplex and decoding circuitry 72B and determines that a memory response message is required, and transmits a "1" on conductor 76B. Circuitry in block 72B also changes the bus number bit of the destination address from 0 to 1, as indicated in FIG. 3B and in block 216 of FIG. 5A. (It should be noted that each memory communications adaptor and each local bus adaptor (FIG. 7) always inserts the bus number of the port to which it is connected into the bus number bit of the source code bit locations of any message before it transmits such message onto that bus.)

Figure 5A:
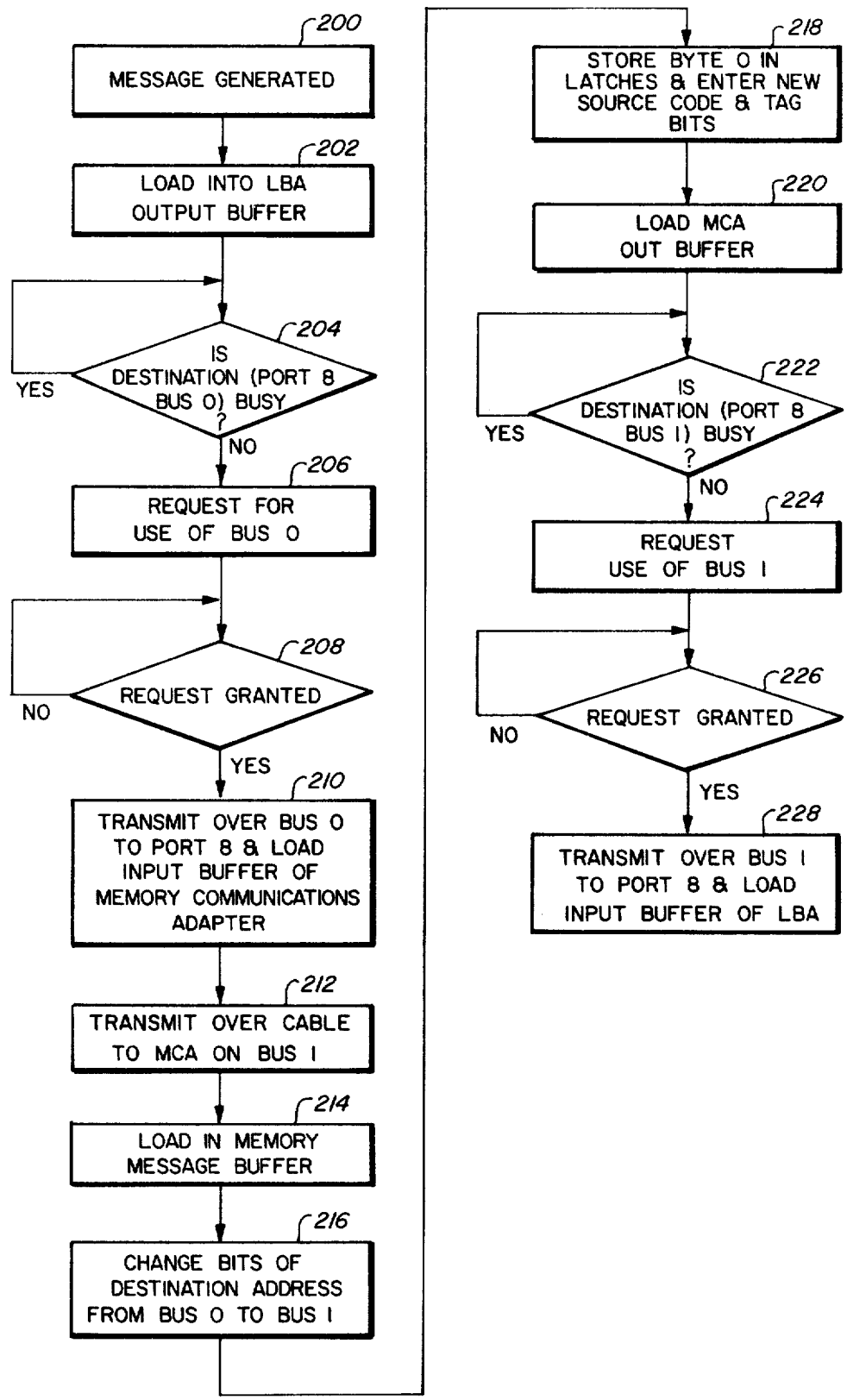
FIG. 5A is a flow diagram describing the sequence of operations as a request message is transmitted from the requesting subsystem to the memory subsystem in FIG. 1.

As a result of the determination by memory communications adaptor 28 that request message 60 requires a response message, memory communications adaptor 28 stores BYTE 0 of WORD 0, including the source code (0 14) and tag bit (α1), in latch circuitry 82B, as indicated by block 218 of FIG. 5A. To accomplish this, BYTE 0 of WORD 0 is loaded via conductors 12B of Bus 1 into latches 82B. A sufficient number of bits are available in latches 82B to store BYTE 0 of WORD 0 of a predetermined maximum number of memory request messages. Each such BYTE 0 includes a source code and tag bit of a separate corresponding request message, and each is subsequently reinserted in a corresponding response message from memory subsystem 20 when that response message is transmitted from memory subsystem 20 to memory communications adaptor 28.

Memory communications adaptor 28 thus inserts its own source code (1 9) and a second tag bit number (α2) into BYTE 0 of WORD 0 of request message 60, thereby producing modified request message 62, as indicated in FIG. 3B. The second tag bit (α2) permits memory communications adaptor 28 to "point" to the location in latches 82B wherein BYTE 0 of WORD 0 of original request message 60 is stored when the corresponding response message is received by memory communications adaptor 28 via Bus 1.

Memory communications adaptor 28 then transmits modified request message 62 via port 9 of Bus 1 to port 8 (as required by the port number "8" in the destination address bits of message 62) to memory subsystem 20, as indicated by the protocol set forth in blocks 220, 222, 224, 226, and 228 of FIG. 5A. The input buffer of the local bus adaptor (see 76 of FIG. 7) of memory subsystem 20 receives modified request message 62. Memory subsystem 20 then accesses a location specified by address information contained in modified request message 62 and fetches the contents of that location. As indicated by block 230 of FIG. 5B, memory subsystem 20 produces response message 64 (FIG. 3C) by inserting source code bits (1 9) of modified request message 62 into the destination address bit locations of memory response message 64, and also automatically loads the destination address bits (1 8) of modified request message 62 into the source code bit locations of response message 64. Tag bits (α2) of modified request message 62 are also loaded into the tag bit locations of response message 64. The information fetched from memory subsystem 20 is loaded into the remaining bytes of response message 64. The circuitry for performing these operations is very conventional, and can be readily implemented by one skilled in the art, and is therefore not disclosed in detail herein.

Figure 5B:
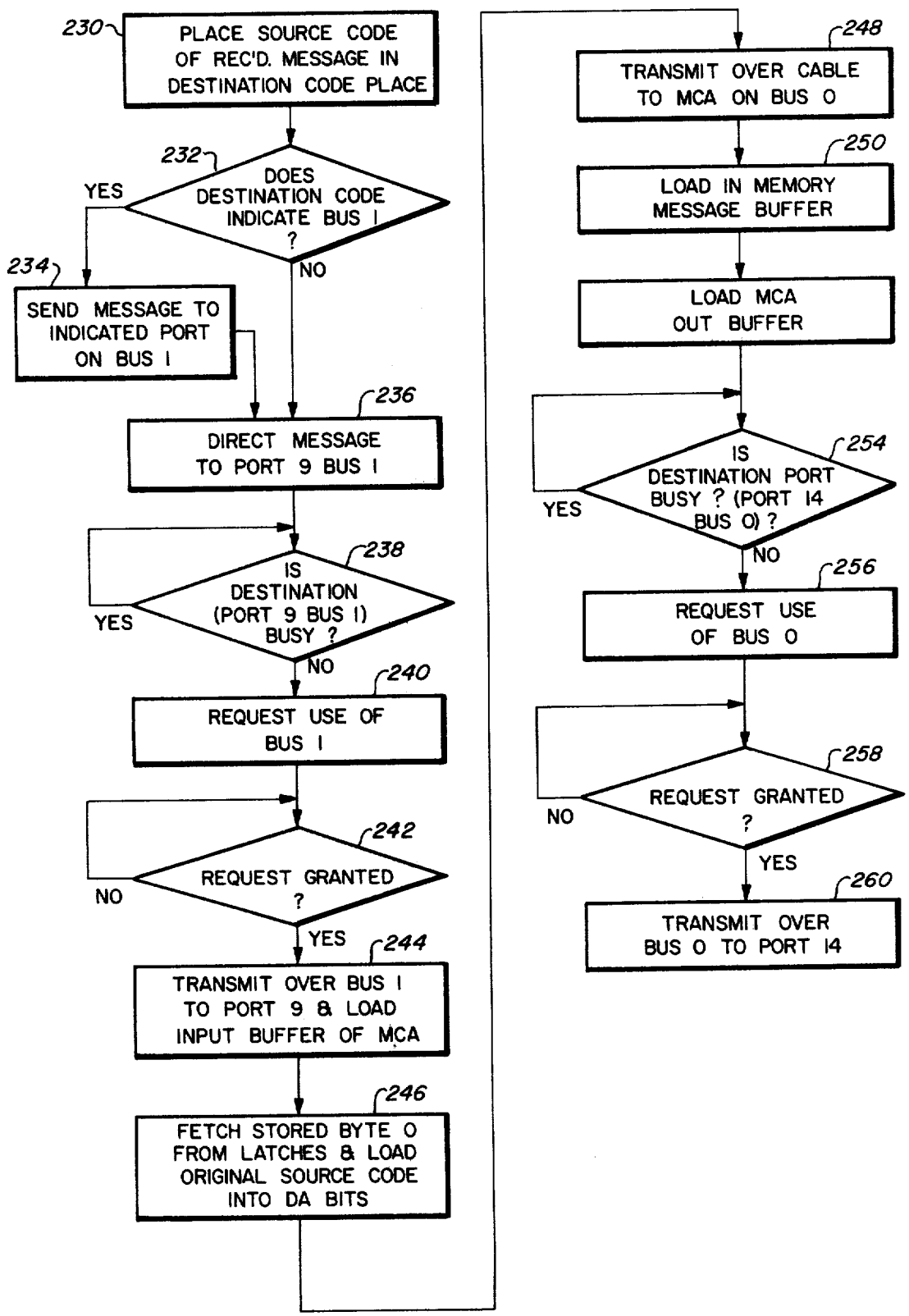
FIG. 5B is a flow diagram illustrating the sequence of operations as a response message is transmitted from the memory subsystem to the requesting subsystem in FIG. 1.

As indicated by the protocol of blocks 232, 234, 236, 238, 240, 242, and 244 of FIG. 5B, response message 64 is then transmitted via port 8 of Bus 1 to the port of Bus 1 specified by the destination address of response message 64, namely, port 9, whereby response message 64 is loaded into the input buffer 90B (FIG. 4) of memory communications adaptor 28.

Decoder 98B "checks" the op code bits of message 64, determines that message 64 is a response, generates a logical "1" on conductor 100B and causes (as explained previously) the tag bit message (α2) to "point to" and select the earlier stored BYTE 0 of WORD 0 of request message 60 from the appropriate locations of latch circuitry 82B. The signal on conductor 100B causes the stored BYTE 0 containing the original source code (0 14) and the original tag bit (α1) to be enabled by multiplex circuitry 94B onto cable conductors 34B. Decoder circuitry 98B, upon learning that the message 64 is a memory response message, modifies response message 64 by inserting the stored original source code bits 0 14 into the destination address bits of modified memory response message 66 and by inserting stored tag bit α1 into the tag bit locations of modified response message 66, as indicated by block 246 of FIG. 5B. The modified response message is then transmitted via cable conductors 34B to receiving buffers 74A of memory communications adaptor 30 (as indicated by 248 and 250 of FIG. 5B). Multiplexer and decoder circuitry 72A then examines the op code and determines that no response is required, and transmits modified response message 66 of FIG. 3D via output buffers 70A to Bus 0 via port 8 and from there to port 14, as specified by the port number

(14) of the destination address of modified response message 66. This sequence is indicated by blocks 254, 256, 258 and 260 of FIG. 5B. Circuitry 25 of requesting subsystem 24 examines the tag bit (α1), and routes the memory response message 66 to the appropriate one of registers 24A, 24B, 24C, etc. At this point, other circuitry, not shown herein and irrelevant to the present invention, processes information from response message 66 in a predetermined manner.

Thus, the memory communications adaptor of FIGS. 1 and 4 permit a requesting subsystem connected to Bus 0 to transmit a plurality of memory request messages to memory subsystem 20 connected to Bus 1 via memory communications adaptors 30 and 28 and cable 34. The corresponding response messages may be transmitted back to requesting subsystem 24 via the same path (i.e., memory communications adaptors 28 and 30 and cable 34) in a different order than the order in which the requesting messages were sent. Thus, the separate memory request message path and memory response message path and associated hardware required by the above referenced Shah patent are avoided, resulting in a substantial savings. Expansion of memory available to a requesting subsystem can be accomplished without the addition of stand-alone memory units and interbus communications systems.

We claim:

1. In a data processing system including first and second busses each having a plurality of addressable ports, a system comprising in combination:
   (a) a memory subsystem connected to a first port of said second bus;
   (b) a subsystem connected to a second port of said first bus, said subsystem including
      i. a plurality of input/output means for transmitting a request message to said first bus;
      ii. means for inserting first identification information into said request message, representing a one of said input/output means from which said request message is transmitted;
   (c) means coupled to said first and second busses, respectively, for routing said request message from said first bus to said second bus and routing any memory response message produced in response to said request message by said memory subsystem from said second bus to said first bus, said routing means including
      i. means for receiving said request message from said first bus and determining if said request message requires a response from said memory subsystem;
      ii. means for temporarily storing said first identification information;
      iii. means responsive to said request message receiving means for modifying said request message to contain second identification information representing an addressable port on said second bus and the location of said stored first identification information in said means for temporarily storing;
      iv. means for transmitting said modified request message to said memory subsystem via said second bus.

2. The system of claim 1 further including means in said routing means for receiving said memory response message from said second bus and modifying said memory response message to contain said first identification information.

3. The system of claim 2 further including means in said routing means for transmitting said modified memory response message to said subsystem via said first bus.

4. The system of claim 3 further including means in said subsystem for routing said modified memory response message to the one of said input/output means identified by said first identification information.

5. The system of claim 1 wherein said routing means includes:
   (a) a first memory communications adaptor circuit coupled to a third port of said first bus, said third port being the same address code as said second port of said second bus;
   (b) a second memory communications adaptor circuit coupled to a fourth port of said second bus; and
   (c) cable means for coupling said first memory communications adaptor to said second memory communications adaptor.

6. The system of claim 5 wherein said request message receiving means includes decoding means in said second memory communications adaptor for decoding an op code of said request message to determine if said request message requires a response from said memory subsystem.

7. The system of claim 5 wherein said memory message modifying means includes a local bus adaptor in said memory subsystem.

8. The system of claim 5 wherein said first and second memory communications adaptors are substantially similar.

9. In a data processing system including first and second time-shared busses each having a plurality of addressable ports, a system comprising in combination:
   (a) a memory subsystem connected to a first port of said second bus;
   (b) a subsystem connected to a second port of said first bus, said subsystem including
      i. a plurality of input/output means for transmitting a request message to said first bus;
      ii. means for providing first identification information in said request message, said identifying information representing a one of said input/output means from which said request message is transmitted;
   (c) means coupled to said first and second busses, respectively, for routing said request message from said first bus to said second bus and routing any memory response message produced in response to said request message by said memory subsystem from said second bus to said first bus, said routing means including
      i. means for receiving said request message from said first bus and determining if said request message requires a response from said memory subsystem;
      ii. means responsive to said request message receiving means for removing said first identification information from said request message and temporarily storing said first identification information;
      iii. means for modifying said request message to contain second identification information representing an addressable port on said second bus and the location of said stored first identification information in said responsive means if said request message requires a response from said memory subsystem;

iv. means for transmitting said modified request message to said memory subsystem via said second bus;

v. means responsive to said request message receiving means for receiving said memory response message from said second bus and for modifying said memory response message to contain said first identification information;

vi. means for transmitting said modified memory response message to said subsystem via said first bus;

vii. means in said subsytem for routing said modified memory response message to one of said input/output means identified by said first identification information.

10. A method for operating a system to access a memory subsystem, the system including first and second busses, and a subsystem connected to the first bus, the memory subsystem being connected to the second bus, the method comprising the steps of:

(a) generating a request message having a first destination code indicating an address of a memory subsystem port on said second bus, a first source code indicating the address of a request message source port on said first bus, and a first identification code indicating one of a plurality of input/ouput paths in said subsystem;

(b) transmitting said request message via said input/output path from said subsystem along said first bus to a port of said first bus selected in response to said first destination code;

(c) storing said first source code and said first identification code if said request message requires a response message from said memory subsystem;

(d) modifying said request message by inserting a second source code indicating the address of a second port of said second bus and a second identification code in said request message if said request message requires a response; and (e) transmitting said modified request message via said second port along said second bus to said memory subsystem port and transmitting said modified request message from said second bus to said memory subsystem via said memory subsystem port in response to said first destination code.

11. The method of claim 10 further including the steps (a) generating a memory response message in response to said modified request message, said memory response message containing said second source code and said second identification information;

(b) transmitting said memory response message along said second bus through said second port of said second bus in response to said second source code; and (c) modifying said memory response message by inserting said stored first source code and said stored identification code into said memory response message.

12. The method of claim 11 further including the step of transmitting said modified memory response message via said first port to said subsystem in response to said first destination code.

13. The method of claim 12 further including the step of transmitting said modified memory response message along said input/output path in response to said first identification code in said modified memory response message.

14. The method of claim 12 further including the step of locating said stored first source code and said stored first identification information in response to said second identification information in said memory response message.

15. The method of claim 10 further including the step of determining whether said request message requires a response prior to step (c).

16. In a data processing system including first and second busses each having a plurality of addressable ports, a system comprising in combination;

(a) a memory subsystem connected to a first port of said second bus;

(b) a subsystem connected to a second port of said first bus, said subsystem including input/output means for transmitting a request message to said first bus, and means for inserting first identification information into said request message identifying said subsystem; and (c) means coupled to said first and second busses, respectively, for routing said request message from said first bus to said second bus and routing any memory response message produced in response to said request message by said memory subsystem from said second bus to said first bus, said routing means including i. means for receiving said request message from said first bus and determining if said request message requires a response from said memory subsystem;

ii. means for temporarily storing said first identification information;

iii. means responsive to said request message receiving means for modifying said request message to contain second identification information representing an addressable port on said second bus and the location of said stored first identification information in said means for temporarily storing; and iv. means for transmitting said modified request message to said memory subsystem via said second bus.

* * * * *